United States Patent
Chundu et al.

(10) Patent No.: US 12,021,656 B2
(45) Date of Patent: Jun. 25, 2024

(54) METHOD AND SYSTEM TO TRANSMIT BROADCAST, UNKNOWN UNICAST, OR MULTICAST (BUM) TRAFFIC FOR MULTIPLE ETHERNET VIRTUAL PRIVATE NETWORK (EVPN) INSTANCES (EVIS)

(71) Applicant: TELEFONAKTIEBOLAGET LM ERICSSON (PUBL), Stockholm (SE)

(72) Inventors: Kotesh Babu Chundu, Bangalore (IN); Hima sagar Kurra, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 315 days.

(21) Appl. No.: 17/619,260

(22) PCT Filed: Jun. 21, 2019

(86) PCT No.: PCT/IN2019/050467
§ 371 (c)(1),
(2) Date: Dec. 15, 2021

(87) PCT Pub. No.: WO2020/255150
PCT Pub. Date: Dec. 24, 2020

(65) Prior Publication Data
US 2022/0311643 A1    Sep. 29, 2022

(51) Int. Cl.
*H04L 12/46* (2006.01)
*H04L 45/00* (2022.01)
*H04L 45/24* (2022.01)

(52) U.S. Cl.
CPC ...... *H04L 12/4641* (2013.01); *H04L 12/4633* (2013.01); *H04L 45/245* (2013.01); *H04L 45/66* (2013.01)

(58) Field of Classification Search
None
See application file for complete search history.

(56) References Cited

U.S. PATENT DOCUMENTS 10,841,216 B1 * 11/2020 Hoang .................. H04L 12/465
2019/0132241 A1 * 5/2019 Vattem ................ H04L 12/4633

FOREIGN PATENT DOCUMENTS

EP          3402134 B1    2/2020

OTHER PUBLICATIONS

Aggarwal R., et al., "BGP Encodings and Procedures for Multicast in MPLS/BGP IP VPNs", Internet Engineering Task Force (IETF), RFC 6514, Feb. 2012.

(Continued)

*Primary Examiner* — Christine T Duong

(57) ABSTRACT

Embodiments of the invention provide efficient ways to transmit Broadcast, unknown Unicast, or Multicast (BUM) traffic for multiple Ethernet Virtual Private Network (EVPN) Instances (EVIs). In one embodiment, a method is performed by a network device, the method comprises identifying a plurality of sets of network devices, each set of network devices to include network devices belonging to one Ethernet Virtual Private Network (EVPN) Instance (EVI) of a plurality of EVIs, for which the network device serves as an ingress network device; selecting an aggregation set of network devices from the identified network devices to set up an aggregation tunnel label switched path (LSP) for multiple EVIs of the plurality of EVIs; and transmitting broadcast, unknown unicast, or multicast (BUM) traffic for the multiple EVIs using the aggregation tunnel LSP.

7 Claims, 9 Drawing Sheets

(56) References Cited

OTHER PUBLICATIONS

RFC 7432: BGP MPLS-Based Ethernet VPN, Internet Engineering Task Force (IETF), Request for Comments: 7432, Category: Standards Track, ISSN: 2070-1721.
Rosen, E., at al., "Multicast in MPLS/BGP IP VPNs", Request for Comments: 6513, Feb. 2012.
Sajassi A. et al, "BGP MPLS-Based Ethernet VPN; rfc7432.txt11", RFC7432, Internet Engineering Task Force, IETF; Standard, Internet Society (SOC) 4, Rue Des Falaises CH- 1205 Geneva, Switzerland, Feb. 18, 2015 (Feb. 18, 2015), pp. 1-56.
Zhang Z., et al., "MVPN/EVPN Tunnel Aggregation with Common Labels", draft-ietf-bess-mvpn-evpn-aggregation-label-01, BESS, Internet-Draft, Updates: 7432, 6514, 7582, Dec. 7, 2018.
Zhang Z. et al., "MVPN/EVPN Tunnel Aggregation with Common Labels draft-zzhang-bess-mvpn-evpn-aggregation-label-01", RFC 7582, Internet-Draft, Updates: 7432, 6514, 7582, Apr. 27, 2018.

\* cited by examiner

Table 1: EVPN instance and PE participation 302

| EVPN Instance Name | Participating PE SET |
|---|---|
| EVPN1 | PE1, PE2, PE3, PE4 |
| EVPN2 | PE1, PE2, PE3 |
| EVPN3 | PE1, PE3, PE4 |
| EVPN4 | PE1, PE2, PE4 |
| EVPN5 | PE1, PE4, PE5 |
| EVPN6 | PE1, PE4, PE5 |

FIG. 3A

Table 2. PE participation percentage in different EVPN instances 304

| PE | EVI set | % Participation |
|---|---|---|
| PE1 | EVPN1, EVPN2, EVPN3, EVPN4, EVPN5, EVPN6 | 100% (Ingress PE) |
| PE2 | EVPN1, EVPN2, EVPN4 | 50% |
| PE3 | EVPN1, EVPN2, EVPN3 | 50% |
| PE4 | EVPN1, EVPN3, EVPN4, EVPN5, EVPN6 | 83% |
| PE5 | EVPN5, EVPN6 | 33% |

FIG. 3B

Ethernet A-D Route Type Message (for non-multi-home scenarios as well as multi-home scenarios) 420

Inclusive Multicast Ethernet Tag (IMET) Route Type Message 424

METHOD AND SYSTEM TO TRANSMIT BROADCAST, UNKNOWN UNICAST, OR MULTICAST (BUM) TRAFFIC FOR MULTIPLE ETHERNET VIRTUAL PRIVATE NETWORK (EVPN) INSTANCES (EVIS)

PRIORITY CLAIM

This application is a national stage of International Application No. PCT/IN2019/050467, filed Jun. 21, 2019, the entire disclosure of which is fully incorporated by reference herein for all purposes.

TECHNICAL FIELD

Embodiments of the present disclosure relate to the field of networking, and more specifically, relate to methods and systems to transmit Broadcast, unknown Unicast, or Multicast (BUM) traffic for multiple Ethernet Virtual Private Network (EVPN) Instances (EVIs).

BACKGROUND ART

Ethernet virtual private network (EVPN) is a next generation all-in-one virtual private network (VPN) that provides Ethernet multipoint solutions over networks (e.g., multiprotocol label switching (MPLS) networks). EVPN provides a wide range of services, such as Ethernet virtual private local area network (E-LAN), E-Line (e.g., Ethernet private line (EPL) or Ethernet virtual private line (EVPL)), Ethernet virtual private tree (E-Tree), data center interconnect (DCI), and Integrated Routing and Bridging (IRB), all of which are provided by earlier technologies. Additionally, EVPN integrates well with Layer 3 (L3) VPN services through EVPN IRB solution.

An EVPN instance (EVI) comprises customer edge devices (CEs) that are connected to provider edge devices (PEs) that form the edge of a network (e.g., an MPLS network). Multiple EVIs may co-exist in a provider network, and each EVI comprises one or more broadcast domains. Broadcast, unknown Unicast, or Multicast (BUM) traffic may be replicated/distributed in the broadcast domains. When the BUM traffic is duplicated through point-to-multipoint (P2MP) label switched paths (LSPs), each EVI comprising a different set of PEs uses a separate P2MP LSP. When a service provider uses a separate P2MP LSP for each broadcast domain, additional P2MP LSPs will be created in the network. Since each P2MP LSP needs to maintain a separate state for its routing, such routing solution for BUM traffic does not scale well and may consume significant resources in the network.

SUMMARY

Embodiments of the invention provide efficient ways to transmit Broadcast, unknown Unicast, or Multicast (BUM) traffic for multiple Ethernet Virtual Private Network (EVPN) Instances (EVIs). In one embodiment, a method is performed by a network device, the method comprises identifying a plurality of sets of network devices, each set of network devices to include network devices belonging to one Ethernet Virtual Private Network (EVPN) Instance (EVI) of a plurality of EVIs, for which the network device serves as an ingress network device; selecting an aggregation set of network devices from the identified network devices to set up an aggregation tunnel label switched path (LSP) for multiple EVIs of the plurality of EVIs; and transmitting broadcast, unknown unicast, or multicast (BUM) traffic for the multiple EVIs using the aggregation tunnel LSP.

Embodiments of the invention include network devices providing efficient ways to transmit BUM traffic for multiple EVIs. In one embodiment, a network device to be deployed in a network is disclosed. The network device includes a processor and computer readable storage medium that provides instructions that, when executed by the processor, cause the network device to perform operations. The operations include identifying a plurality of sets of network devices, each set of network devices to include network devices belonging to one EVI of a plurality of EVIs, for which the network device serves as an ingress network device; selecting an aggregation set of network devices from the identified network devices to set up an aggregation tunnel label switched path (LSP) for multiple EVIs of the plurality of EVIs; and transmitting BUM traffic for the multiple EVIs using the aggregation tunnel LSP.

Embodiments of the invention include non-transitory computer-readable storage media providing efficient ways to transmit BUM traffic for multiple EVIs. In one embodiment, a non-transitory computer-readable storage medium is disclosed, where it provides instructions that, when executed by a processor of a network device to be implemented in a network, cause the network device to perform operations. The operations include identifying a plurality of sets of network devices, each set of network devices to include network devices belonging to one EVI of a plurality of EVIs, for which the network device serves as an ingress network device; selecting an aggregation set of network devices from the identified network devices to set up an aggregation tunnel label switched path (LSP) for multiple EVIs of the plurality of EVIs; and transmitting BUM traffic for the multiple EVIs using the aggregation tunnel LSP.

Through embodiments of the invention, a point-to-multipoint (P2MP) label switched path (LSP) may be established for multiple EVIs or multiple domains of a given EVI, so that fewer labels may be consumed by BUM traffic. The P2MP LSP for multiple EVIs or multiple domains of a given EVI also requires less signaling than the multiple P2MP LSPs, each of which is dedicated to an EVI or an EVI domain.

BRIEF DESCRIPTION OF THE DRAWINGS

The invention may best be understood by referring to the following description and accompanying drawings that illustrate embodiments of the invention.

FIG. 3A illustrates EVPN instances (EVIs) and PE participation of one network per one embodiment of the invention.

FIG. 3B illustrates PE participation percentages of the network per one embodiment of the invention.

DETAILED DESCRIPTION

Figure 1A:
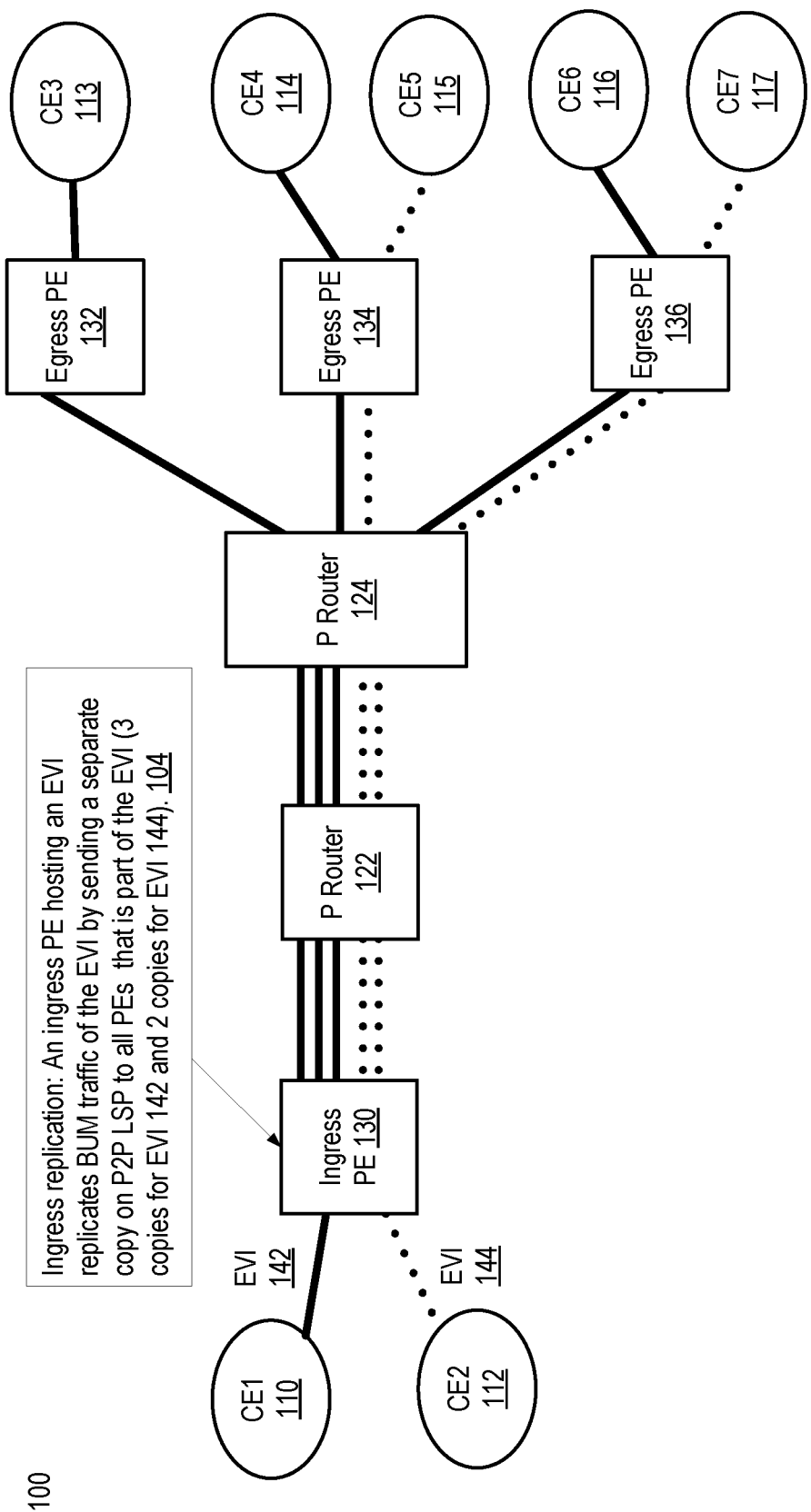
FIG. 1A illustrates ingress replication for flooding BUM traffic in a network.

The following description describes methods, apparatus, and computer programs to transmit Broadcast, unknown Unicast, or Multicast (BUM) traffic for multiple Ethernet Virtual Private Network (EVPN) Instances (EVIs) in a network. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits, and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc., are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other, A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors, and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A network device (ND) (also referred to as a network node, or node, and these terms are used interchangeably in this disclosure) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

BUM Traffic Flooding in a Network

Ethernet virtual private network (EVPN) is advantageous over existing Virtual Private LAN Service (VPLS) in some environments such as DCI (Data Center Interconnect) for service providers. For example, EVPN may provide active-active multi-homed edge devices, load balancing across active-active links, mobility, and multi-tenancy.

In EVPN, media access control (MAC) learning between provider edge devices (PEs) happens through Boarder Gateway Protocol (BGP) control plane signaling, and that is very different from traditional bridging in VPLS (e.g., E-LAN service). Control plane learning offers greater control over the MAC learning process, such as restricting who learns what, and the ability to apply policies.

In EVPN, PEs may advertise the MAC addresses learned from customer edge devices (CEs) that are connected to them, along with an MPLS label, to other PEs in the control plane using Multiprotocol BGP (MP-BGP). Control plane learning enables load balancing of traffic to and from CEs that are multihomed to multiple PEs. This is in addition to load balancing across a network (e.g., an MPLS core network) via multiple LSPs between the same pair of PEs. In other words, EVPN allows CEs to connect to multiple active points of attachment. EVPN (with multihoming) additionally improves convergence times in the event of certain network failures.

BGP defines network layer reachability information (NLRI) for EVPN control plane signaling of MAC/IP routes. The BGP route types defined for EVPN include the following: (1) Ethernet Auto-Discovery (A-D) route; (2) MAC/IP Advertisement route; (3) Inclusive Multicast Ethernet Tag (IMET) route; and (4) Ethernet segment route.

In EVPN, Broadcast, unknown Unicast, and Multicast (BUM) traffic includes (1) broadcast traffic, (2) unknown unicast traffic that is broadcasted in an Ethernet segment, and (3) multicast traffic. BUM traffic may be sent to multiple destinations (e.g., PEs) using techniques such as (1) ingress replication and (2) point-to-multi-point (P2MP).

With ingress replication, an ingress PE that hosts a specific EVPN instance (EVI) replicates the BUM traffic to all the PEs that are part of the EVI by sending a separate copy on the point-to-point (P2P) LSP corresponding to each PE that is part of that EVI. FIG. 1A illustrates ingress replication for flooding BUM traffic in a network. Network 100 includes several types of network devices such as customer edge devices (CEs) 110, 112-117, provider edge devices (PEs) 130, 132, 134, 136, and provider routers (P routers) 122, 124. A provider's network devices PEs and P routers form the provider's network, often referred to as a core network; and CEs of customers form various edge networks. In one embodiment, network 100 complies with multiprotocol label switching (MPLS) protocols thus is referred to as an MPLS network.

In network 100, ingress PE 130 hosts EVIs 142 and 144 that are sourced from CE1 and CE2 at references 110 and 112, respectively. Traffic of EVIs 142 and 144 traverses the provider's network and reaches egress PEs 132, 134, 136, which is then transmitted to destination CE3-CE7 at references 113-117. A copy of BUM traffic of an EVI is transmitted on a P2P LSP to each PE that is part of the EVI as explained by reference 104. For example, the BUM traffic of EVI 142 is copied three times, each on a P2P LSP for a PE that is part of EVI 142. Thus, three P2P LSPs (PE 130 to PE 132, PE 130 to PE 134, and PE 130 to PE 136) are established for EVI 142. The BUM traffic of EVI 142 floods network 100 through replication at ingress PE 130. Similarly, the BUM traffic of EVI 144 is replicated twice. Such replication may waste a significant amount of network bandwidth, and thus it is not the optimal way of flooding BUM traffic.

Instead of ingress replication, multiple P2MP LSPs may be established for BUM traffic. In that case, each PE that is part of an EVI forms a P2MP LSP to all other PEs of the EVI through multicast label distribution protocol (MLDP). Through P2MP LSPs, the BUM traffic is replicated only where there is a branch point in the provider's network, and that conserves network bandwidth by replicating only where required in the provider's network.

Figure 1B:
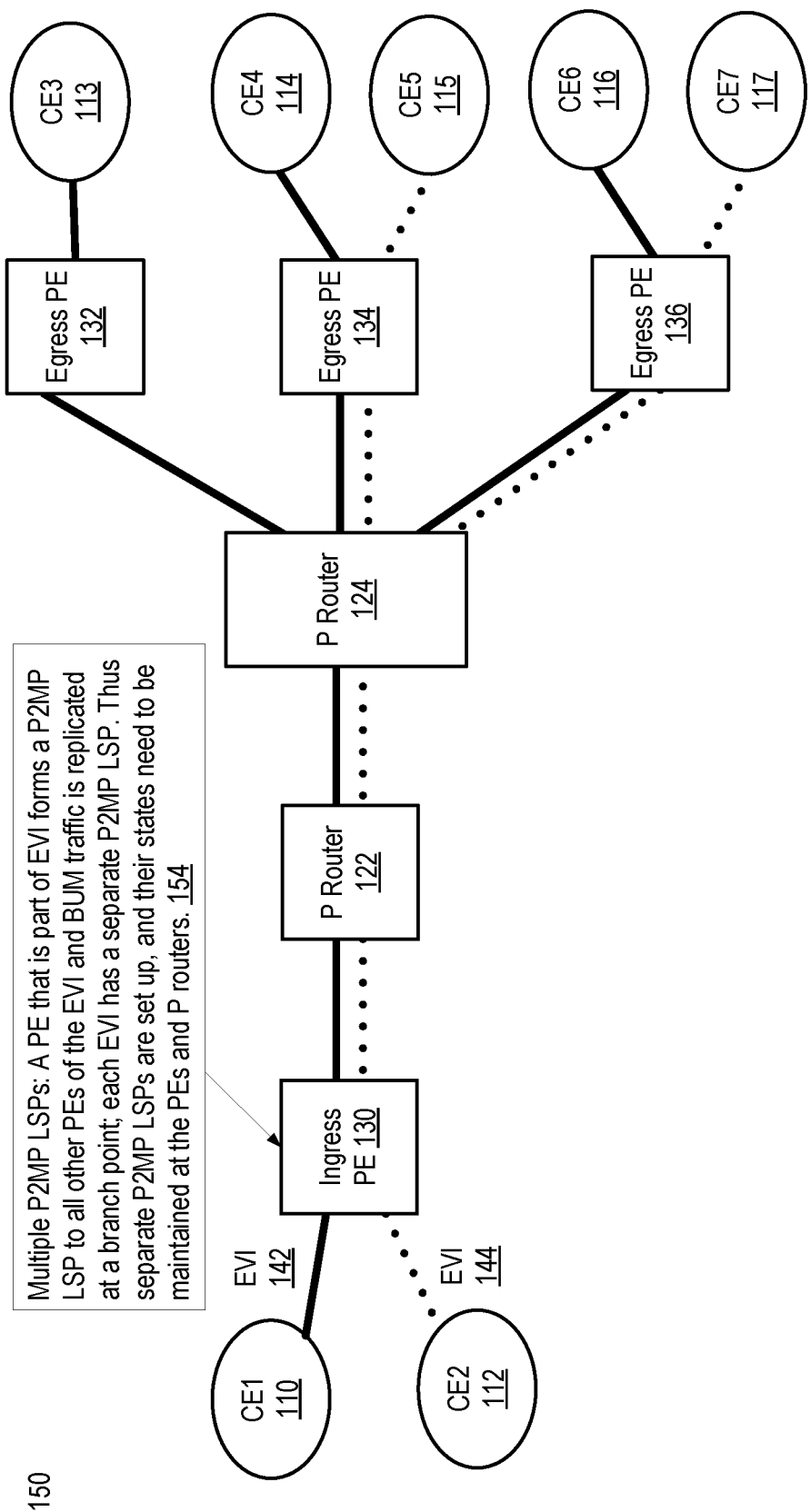
FIG. 1B illustrates multiple P2MP LSPs for BUM traffic flooding in a network.

FIG. 1B illustrates multiple P2MP LSPs for BUM traffic flooding in a network. Network 150 is similar to network 100 and the same references indicate elements or components having the same functionalities.

For the distribution of BUM traffic, each EVI comprising a different set of PEs uses a separate P2MP LSP. One P2MP LSP is thus established for EVI 142 and another for EVI 144 in network 150. When a service provider uses a separate P2MP LSP for each broadcast domain, more P2MP LSPs will be created in the provider's network. Each P2MP LSP needs to maintain a separate state for its routing (e.g., state information of a P2MP LSP being stored using one or more label forwarding information base (LFIB) state entries) in a provider router (P router) in the provider's network. Similarly, the state information of each P2MP LSP may be required to be maintained at the ingress and egress PEs as well. The multiple P2MP LSPs and their state maintenance are explained at reference 154.

When a given PE hosts a large number of EVIs, the scale of P2MP LSPs may affect unicast P2P LSPs and other label forwarding applications such as BGP labeled unicast (LU), as each network device (e.g., PEs or P routers) has only a limited storage to store routing state information (e.g., the number of label entries supported by a router may be capped at a pre-determined number). Some network devices such as cell site routers (CSRs) are (1) deployed widely in various networks (e.g., mobile backhaul networks) and (2) have more constrained storage, and the scale limitation placed on network implementation due to these network devices' storage capacity is even more pronounced.

It is thus advantageous to aggregate BUM traffic of different EVIs or BUM traffic of different broadcast domains of the same EVI to conserve storage space required for storing BUM routing state information. When fewer labels are consumed by the BUM traffic, other traffic such as P2P LSPs for unicast and BGP LU tunnels may use more labels to provide end-to-end traffic distribution in the network.

Aggregation Tunnel LSP

In one embodiment of the invention, a P2MP LSP is established for different EVIs and/or different broadcast domains of a given EVI so that it may carry BUM traffic of the different EVIs and/or different broadcast domains of the given EVI. For simplicity of discussion, most examples in this Specification are about P2MP LSPs for different EVIs, but embodiments of the invention apply to P2MP LSPs for different broadcast domains of a given EVI unless indicated otherwise.

Figure 2:
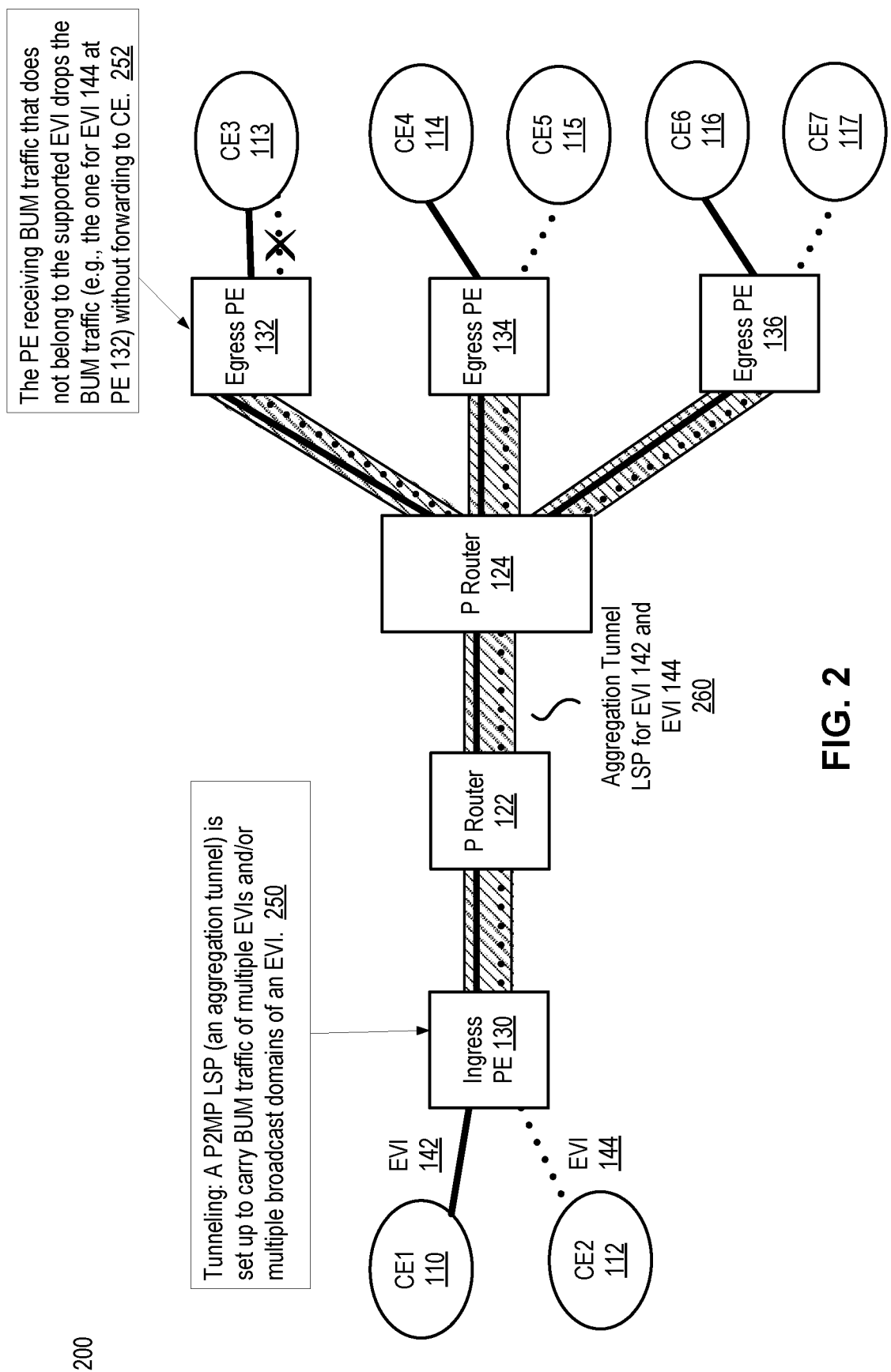
FIG. 2 illustrates a P2MP LSP to transmit BUM traffic for multiple EVIs per one embodiment of the invention.

FIG. 2 illustrates a P2MP LSP to transmit BUM traffic for multiple EVIs per one embodiment of the invention. Network 200 is similar to network 100 and the same references indicate elements or components having the same functionalities.

As explained at reference 250, a P2MP LSP is established for multiple EVIs and/or multiple broadcast domains of an EVI hosted by ingress PE 130. The aggregation tunnel LSP is for EVI 142 and EVI 144 as shown at reference 260. BUM traffic for both EVIs are transmitted through the P2MP LSP.

By aggregating the BUM traffic for different EVIs and/or different broadcast domains of a given EVI in a single P2MP LSP, fewer LSPs are established in the provider's network. The fewer LSPs require less LSP signaling messages between PEs and/or between a PE and a P router for the BUM traffic transmission, thus network bandwidth for the BUM traffic is saved.

Additionally, such reduction allows PEs and P routers to store less state information (e.g., using fewer LFIB entries). As explained earlier, each network device has only limited storage for state information storage, and the moderated state information storage reduces BUM traffic's demand for MPLS labels, so that other applications such as P2P LSPs and BGP LU may use more labels to provide end-to-end traffic distribution in the network.

Note that some egress PEs may receive BUM traffic that does not belong to the EVI(s) supported by the egress PEs, and the BUM traffic is dropped without forwarding to the coupled CE. At reference 252, for example, egress PE 132 does not host EVI 144, thus when the BUM traffic for EVI 144 is transmitted to egress PE 132 through the single aggregation tunnel LSP 260, egress PE 132 drops the BUM traffic for EVI 144. That is, when a P2MP LSP is set up for multiple EVIs and/or multiple broadcast domains of a given EVI, the egress PE that receives the BUM traffic (1) for an EVI that the egress PE does not belong to, and/or (2) for a broadcast domain that the egress PE does not belong to, may drop the BUM traffic. Carrying the BUM traffic that is eventually dropped by the egress PE on the single aggregation tunnel LSP wastes network bandwidth and/or a network device's processing resources and is sub-optimal for the transmission of the BUM traffic. Preferably, a proper set of PEs may be selected for the P2MP LSP for multiple EVIs and/or broadcast domains of a given EVI so that the dropped BUM traffic is reduced.

PE Selection for Aggregation Tunnel LSP

An ingress PE may select multiple PEs to be included in a P2MP LSP so that the P2MP LSP (a single aggregation tunnel LSP) may carry the BUM traffic for different EVIs and/or different broadcast domains of a given EVI. The ingress PE may first identify the active PE set of an EVI (the PEs that participate in the EVI). For example, ingress PE 130 may identify that egress PEs 132, 134, 136 are active PEs of EVI 142 in FIG. 2. Such identification may be accomplished through exchanging BGP Auto-Discovery (AD) (AD stands for active-discovery in some applications) messages between PEs of the network. An ingress PE may obtain the PE sets for all the EVIs and/or broadcast domains of a given EVI by exchanging BGP AD messages with other PEs in the network.

Note that the EVPN standards (e.g., Request for Comments (RFC) 7432 "BOP MPLS-Based Ethernet VPN" dated February 2015, the entire contents of which are incorporated by reference herein for all purposes) require BGP AD message exchanging only in multi-home scenarios. Some embodiments of the invention remove the coupling between BOP AD message exchanging and multi-homing so that the BGP AD message exchanges are performed in scenarios without multi-homing. For example, a network device in a provider's network may perform BGP AD message exchanging regardless whether multi-homing is provisioned. Additionally or alternatively, some embodiments may require EVPN AD route generation (thus triggering the BGP AD message exchanging) based on a user input (e.g., through a command line interface (CLI) and/or a graphic user interface (GUI)) when the feature of establishing the aggregation tunnel LSP is enabled. In some embodiments, the EVPN AD route generation is activated when the feature of establishing the aggregation tunnel LSP is enabled without any user input.

While the ingress PE may obtain the PE sets for all the EVIs and/or broadcast domains of a given EVI and select the PEs for an aggregation tunnel LSP, other network devices may also select the PEs for the aggregation tunnel LSP. For example, a management entity (e.g., a software-defined networking (SDN) controller and/or a path computation element (PCE)) may select the PEs for an aggregation tunnel LSP and notify all the PEs involved in the LSP.

One approach of the PE selection for an aggregation tunnel LSP is to find a plurality of EVIs that have the exact same PE set, and include the PE set in the aggregation tunnel LSP. While such approach is logical, it is not typical that multiple EVIs will share the exact same PE set. Thus, this approach may find limited usage in practice.

Another approach is to devise a heuristic method and determine whether to add a given PE to an aggregation set for an aggregation tunnel LSP. The heuristic method may give a service provider the flexibility to control BUM aggregation through the PE selection. Alternatively or additionally, one or more PE policies may be implemented to select a suitable aggregation PE set for the aggregation tunnel LSP.

Note that the PE selection for an aggregation tunnel LSP is a compromise among multiple factors. For example, when an aggregation tunnel LSP includes more PEs and corresponding EVIs, fewer labels are consumed by BUM traffic and storage space is saved at network devices (e.g., fewer LFIB state entries) as discussed earlier. Yet when the aggregation tunnel LSP includes more PEs and corresponding EVIs, more BUM traffic will be forwarded by the ingress PE to PEs for which the EVI is not present (e.g., EVI 144 is forwarded to PE 132 that does not host EVI 144). Such BUM traffic is dropped at the egress PEs, thus the bandwidth used to transmit the BUM traffic to the non-hosting egress PE is wasted. Thus, competing factors should be considered to use a PE selection heuristic method and/or selection policy to select the aggregation PE set for an aggregation tunnel LSP.

PE Selection Heuristics

In one embodiment, a PE selection heuristic method is based on the participation of PEs in the number of EVIs hosted by a PE (e.g., the ingress PE). FIG. 3A illustrates EVPN instances (EVIs) and PE participation of one network per one embodiment of the invention. The network may be a provider's network (e.g., a core network) such as network 100, 150, or 200. Table 1 at reference 302 illustrates the EVIs of the network and the respective PE set for each EVI. For example, EVPN1 has participating PEs including PE1, PE2, PE3, and PE4; and EVPN6 has participating PEs including PE1, PE4, and PE5.

Based on the participation of PEs in the EVIs, a PE-based table may be generated. FIG. 3B illustrates PE participation percentages of the network per one embodiment of the invention. Table 2 at reference 304 illustrates the PE participation percentage for each PE that participates in at least one EVI of Table 1. Since PE1 is the ingress PE for which the aggregation tunnel LSP is to be established, it participates in all the EVIs, and thus its participation percentage is 100%. The rest of the PEs participate in a subset of EVIs. For example, as shown in Table 1, PE5 participates in two (EVPN5 and EVPN6) out of a total of six EVPNs (EVPN1-EVPN6), and thus its participation is 2/6≈33%.

One may set the aggregation heuristic threshold to be, for example, 80%, and then the aggregation PE set for the aggregation tunnel LSP of this example has only two PEs: Aggregation PE set={PE1, PE4}. The corresponding EVIs covered by the aggregation PE set in this example is null as there is no EVI that has only PE1 and PE4 as the active PE set: Aggregation EVI set={null} and aggregation coverage percentage=0%.

In another example, if the aggregation heuristic threshold is reduced to be 50%, then the aggregation PE set for the aggregation tunnel LSP has four PEs: Aggregation PE set={PE1, PE2, PE3, PE4}. The corresponding EVIs covered by the aggregation PE set is Aggregation EVI set={EVPN1, EVPN2, EVPN3, EVPN4} and aggregation coverage percentage≈66%. In yet another example, if the aggregation heuristic threshold is set to be 30%, then the aggregation PE set for the aggregation tunnel LSP covers all five PEs: Aggregation PE set={PE1, PE2, PE3, PE4, PE5}. The corresponding EVIs covered by the aggregation PE set is Aggregation EVI set={EVPN1, EVPN2, EVPN3, EVPN4, EVPN5, EVPN6} and aggregation coverage percentage is 100%.

Aggregating BUM traffic for a plurality of EVIs in an aggregation tunnel LSP may save network resources (e.g., MPLS labels) and bandwidth as discussed herein. Such saving is based on common PEs being present in the EVIs—if all the EVIs have completely different aggregation PE sets, such aggregation tunnel LSP has no real value. The saving depends on PE participation and how PEs are selected into the aggregation tunnel LSP. In this example, when the aggregation heuristic threshold is set to be 80%, no aggregation tunnel LSP may be established for an EVI; in contrast, when the aggregation heuristic threshold is set to be 30%, an aggregation tunnel LSP may be established for all EVIs hosted by the ingress PE. In one embodiment, the aggregation heuristic threshold may be dynamically calculated in the application; alternatively, it can be given as a configuration option to service providers to control the BUM aggregation. Furthermore, the network device manufacturer (or a third party) may provide a service to service providers to examine the EVI coverages for different aggregation heuristic thresholds. Based on that information, the network device manufacturer or the service providers may select the right aggregation heuristic method (including one or more thresholds) and configure for the P2MP aggregation tunnel LSP.

PE Selection Policy

In alternative or in addition, the PE selection may be based on one or more PE selection policies. For example, one may select the aggregation PE set heuristically as discussed herein and then refine the selection based on a PE selection policy; or one or more PE selection policies may be implemented without heuristic PE selection. A number of PE selection policies are enumerated below, but embodiments of the invention are not limited to the enumerated PE selection policies or any combination thereof.

(1) One PE selection policy is to include all PEs that participate in the EVIs hosted by an ingress PE. This policy is useful when it is desirable for a service provider to combine all the BUM traffic into one tunnel (e.g., when the BUM traffic is sparse in the network).

(2) Another PE selection policy is to exclude a PE from the aggregation PE set based on one or more factors. For example, the exclusion may be based on certain capacity of the PE such as its storage size or services/applications implemented on the PE. For another example, a PE may be excluded if the PE is enabled for EVPN integrated routing and bridging (IRB), as the exclusion will avoid a large volume of BUM traffic by proxy address resolution protocol (ARP) and/or neighbor discovery (ND) proxy. Additionally or alternatively, a PE may be excluded when it may generate IP multicast traffic when it is included in the aggregation tunnel LSP.

(3) Another PE selection policy is to exclude an EVI from aggregation evaluation. For example, the EVI may contain more than a configured number of Broadcast domains (more broadcast domains can increase BUM traffic and possibly cause more traffic on the aggregated P2MP LSP). The service provider may also deem the EVI to be unsuitable for aggregating, thus excluding the EVI.

(4) A set of PE selection policies concerns EVI broadcast domains. For example, a PE selection policy may set up a single aggregation tunnel LSP for all the BUM traffic of all the broadcast domains of an EVI, and hence exclude this EVI from being included in the aggregation selection for another aggregation tunnel LSP. For another example, a PE selection policy may set up a single aggregation tunnel LSP for one or more selected broadcast domains of a given EVI, and hence exclude these broadcast domains from being included in the aggregation selection for another aggregation tunnel LSP.

These and other PE selection policies may be implemented by configuring the EVPNs. For example, a user may input PE selection policy parameters through a command line interface (CLI) and/or a graphic user interface (GUI). Such PE selection policy parameters become a part of EVPN configuration information to be promulgated to the ingress/egress PEs and other network devices, such as P routers, in the network.

Signaling for Aggregation Tunnel LSP

Signaling is exchanged between PEs and between a PE and another network device so that EVPN configuration information, including parameters of PE selection policies and heuristics for one or more aggregation tunnel LSPs, may be provided to the network devices involved in the one or more aggregation tunnel LSPs.

The EVPN configuration information may be exchanged using EVPN network layer reachability information (NLRI). The information in the NLRI field may be carried in BGP using BGP multiprotocol extension with an address family identifier (AFI) and a subsequent address family identifier (SAFI) as defined in RFC 7432. The defined route types, such as the Ethernet A-D route and Inclusive Multicast Ethernet Tag (IMET) route, may be used for the exchange of EVPN configuration information.

Figure 4A:
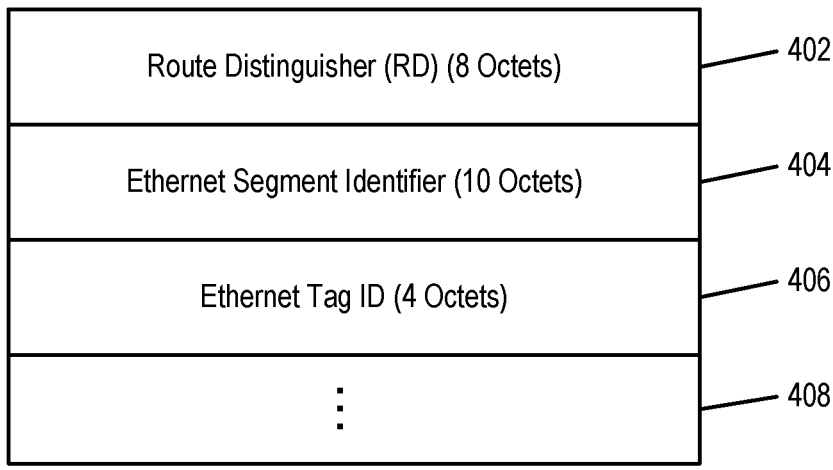
FIG. 4A illustrates the Ethernet A-D route fields within network layer reachability information (NLRI) per one embodiment of the invention.

FIG. 4A illustrates the Ethernet A-D route fields within NLRI per one embodiment of the invention. For BGP route key processing, the Ethernet Segment Identifier 404 and the Ethernet Tag ID 406 are part of the prefix in the NLRI. The Ethernet A-D route fields identify whether a PE participates in an EVI. The Ethernet segment identifier 404 and/or Ethernet Tag ID 406 identifies the EVI for which the NLRI is exchanged. Based on information in the Ethernet A-D route fields, a PE (e.g., an ingress PE) or a management entity (e.g, an SDN controller or PCE) may determine which PEs participate in a given EVI.

Figure 4B:
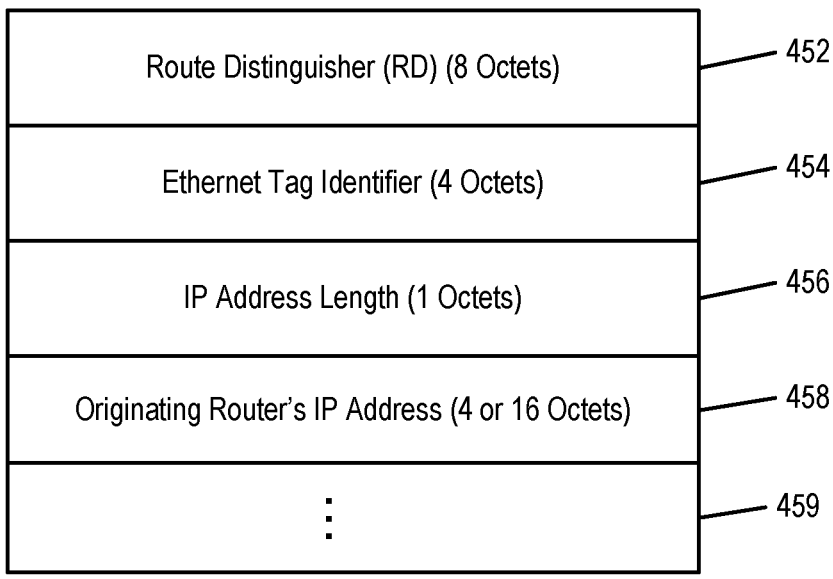
FIG. 4B illustrates the Inclusive Multicast Ethernet Tag (IMET) route fields within NLRI per one embodiment of the invention.

FIG. 4B illustrates the Inclusive Multicast Ethernet Tag (IMET) route fields within NLRI per one embodiment of the invention. BUM traffic may be broadcast using a P-tunnel, which is a tunnel to transmit traffic through the network of one or more service providers. The IMET route carries a Provider Multicast Service Interface (PMSI) Tunnel attribute for the BUM traffic broadcast. The PMSI tunnel attribute carried in the IMET is defined in the standards, e.g., RFC 6514, entitled "BOP Encodings and Procedures for Multicast in MPLS/BGP IP VPNs," published in February 2012, the entire contents of which are incorporated by reference herein for all purposes.

Depending on the technology used by the P-tunnel for the EVPN instance on the PE, the PMSI Tunnel attribute of the Inclusive Multicast Ethernet. Tag route is constructed as follows.

If the PE that originates the advertisement uses a P-multicast tree for the P-tunnel for EVPN, the PMSI Tunnel attribute contains the identity of the tree (note that the PE could create the identity of the tree prior to the actual instantiation of the tree).

A PE that uses a P-multicast tree for the P-tunnel may aggregate two or more EVPN instances (EVIs) present on the PE onto the same tree. In this case, in addition to carrying the identity of the tree, the PMSI Tunnel attribute carries an MPLS upstream assigned label, which the PE has bound uniquely to the EVI associated with this update (as determined by its route targets (RTs)). These upstream assigned labels are per PE based and work like virtual routing and forwarding (VRF) labels in the case of L3 VPN upstream label allocation schema. Alternatively, the service provider of the network may be allowed to provision these aggregation labels exclusively per PE.

Initially when EVIs are configured, a separate P2MP LSP is created by default for each EVI. When a service provider configures the BUM aggregation feature (e.g., by configuring the BUM aggregation policy parameters), an aggregation tunnel LSP is created to cover a specific set of EVIs based on information of the aggregation tunnel LSP. The ingress PE (e.g., an EVPN module within the ingress PE) may generate (1) an IMET BGP EVPN route with P-Tunnel information as mentioned above, and (2) upstream assigned label for each EVI that is covered by an aggregation set for BUM traffic.

Once the aggregation tunnel LSP information is exchanged with all the PEs present in the calculated aggregation set, the separate P2MP LSPs that were created initially will be withdrawn and deleted from the network, and all the BUM traffic of aggregated EVIs will be forwarded on the aggregation tunnel LSP along with the upstream assigned label.

BUM traffic will reach each of the PEs in the aggregation set, and an egress PE will check the upstream assigned label by the ingress PE to get the EVI information to send the traffic towards respective CEs. If the given upstream assigned label does not have any mapping on a given egress PE, the BUM traffic will be dropped as illustrated at FIG. 2 reference 252.

Operations Per Some Embodiments

Figure 5:
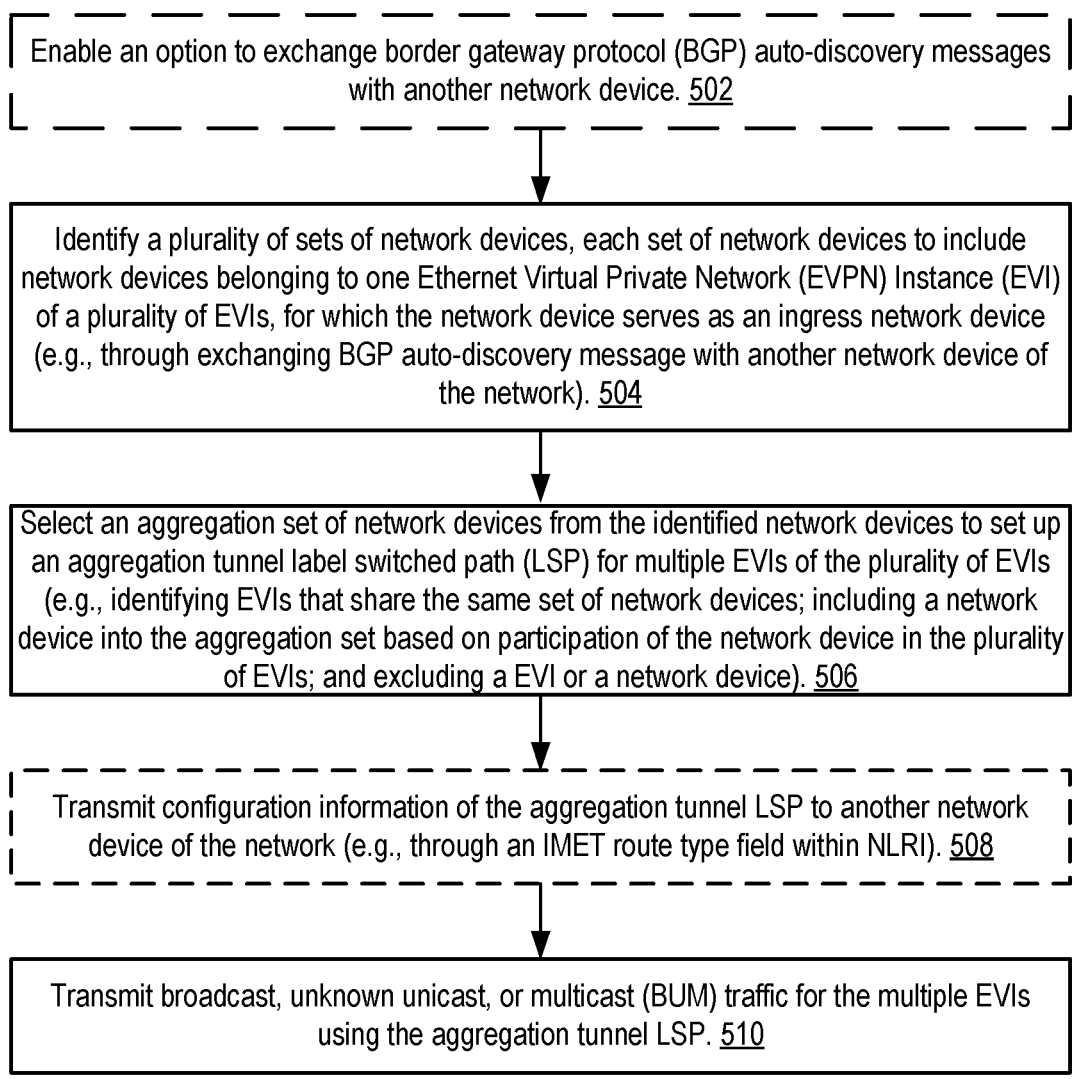
FIG. 5 is a flow diagram illustrating the operations to transmit Broadcast, unknown Unicast, or Multicast (BUM) traffic for multiple Ethernet Virtual Private Network (EVPN) Instances (EVIs) per some embodiments of the invention.

FIG. 5 is a flow diagram illustrating the operations to transmit Broadcast, unknown Unicast, or Multicast (BUM) traffic for multiple Ethernet Virtual Private Network (EVPN) Instances (EVIs) per some embodiments of the invention. Method 500 may be performed by a network device (e.g., ingress PE 130) in a network (e.g., network 200).

At reference 502, the network device may enable an option to exchange border gateway protocol (BGP) Auto-Discovery (AD) messages with another network device. The option may be enabled based on a user input as discussed herein above relating to FIG. 2. The operation is optional as the BGP AD message exchange is enabled by default in some scenarios (e.g., when multi-homing is implemented).

At reference 504, the network device identifies a plurality of sets of network devices, each set of network devices to include network devices belonging to one Ethernet Virtual Private Network (EVPN) Instance (EVI) of a plurality of EVIs, for which the network device serves as an ingress network device. For example, the network device may be ingress PE 130 discussed herein above. Each set of network devices participates in a respective EVI at the ingress network device. In one embodiment, the network device identifies the plurality of sets of network devices through exchanging, border gateway protocol (BGP) auto-discovery messages with another network device of the network.

At reference 506, the network device selects an aggregation set of network devices from the identified network devices to set up an aggregation tunnel label switched path (LSP) for multiple EVIs of the plurality of EVIs. The selection of the aggregation set of network devices comprises identifying EVIs that share the same set of network devices in one embodiment.

In one embodiment, the selection of the aggregation set of network devices comprises including a network device into the aggregation set based on participation of the network device in the plurality of EVIs. In one embodiment, including the network device into the aggregation set is based on a number of EVIs to which the one network device belongs. In one embodiment, the network device is included when a measure of the number of EVIs to which the one network device belongs is over a threshold. In one embodiment, the threshold is provided to the network device by another network device, e.g., an SDN controller or a PCE. FIGS. 3A-B and related discussion provide examples of the selection.

In one embodiment, selecting the aggregation set for the aggregation tunnel LSP comprises excluding a network device from the aggregation set based on an aggregation policy. In one embodiment, an EVI is excluded from setting up the aggregation tunnel LSP based on broadcast domains with which the EVI is configured. The exclusion of the network device and/or EVI is discussed herein above relating to PE selection policy.

At reference 508, the network device may transmit configuration information of the aggregation tunnel LSP to another network device of the network (e.g., through an IMET route type field within NLRI) as discussed herein above per one embodiment of the invention.

At reference 510, the network device transmits BUM traffic for the multiple EVIs using the aggregation tunnel LSP.

Note that while in some embodiments, the operations of method 500 are performed by the ingress network devices, some operations of method 500 may be performed by another network device such as an SDN controller or PCE in other embodiments. For example, the other network device may enable the option to exchange BGP AD messages, identify the plurality of sets of network devices, and/or select the aggregation set of network devices.

Through embodiments of the invention, a P2MP LSP may be established for multiple EVIs or multiple domains of a given EVI, so that fewer labels may be consumed by BUM traffic. The P2MP LSP for multiple EVIs or multiple domains of a given EVI also requires less signaling than the multiple P2MP LSPs, each of which is dedicated to an EVI or an EVI domain.

Network Environment Utilizing Embodiments of the Invention

Figure 6A:
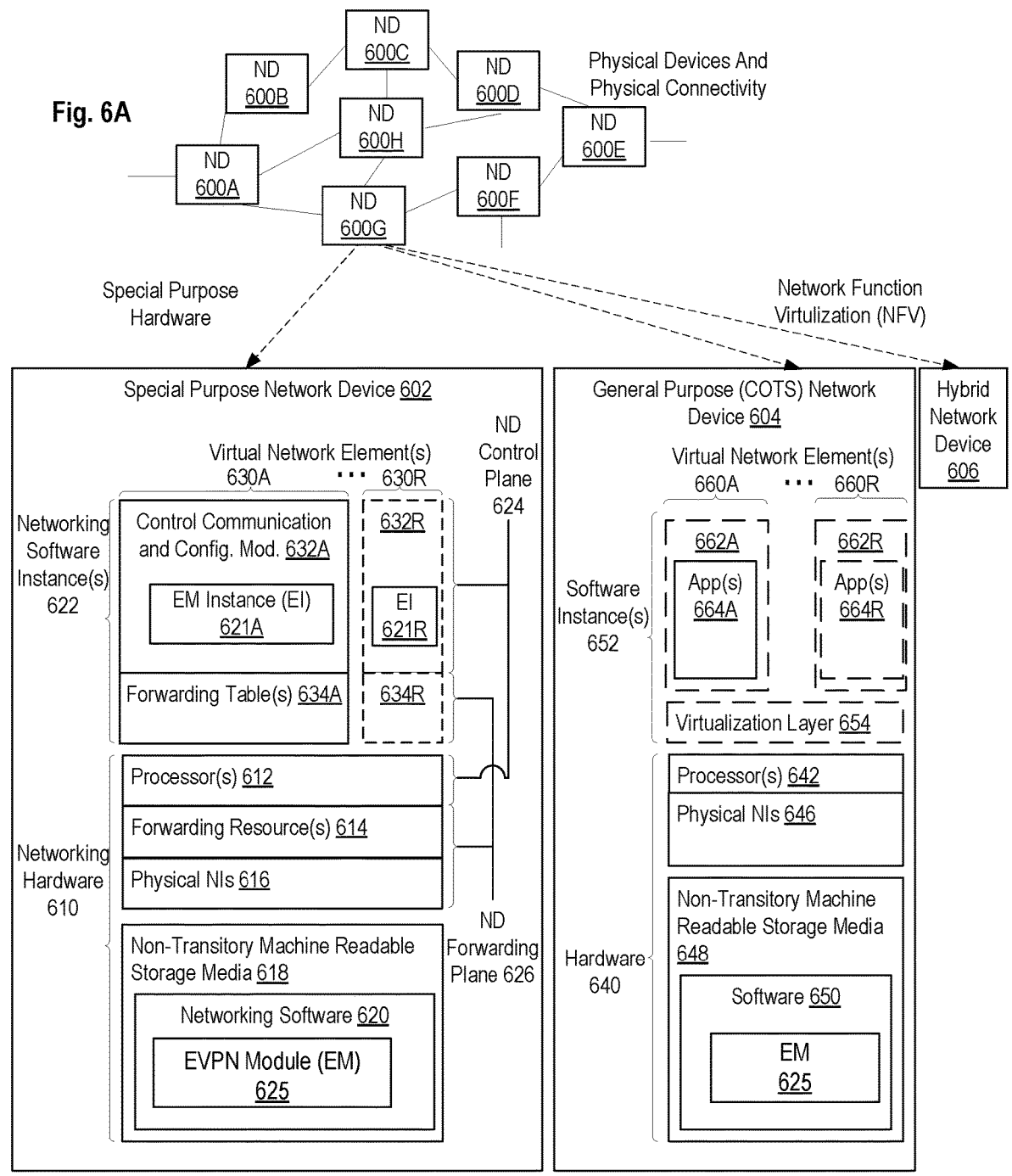
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a special-purpose operating system (OS); and 2) a general-purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine-readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In one embodiment, the networking software 620 includes an EVPN module 625 that may perform method 500 discussed herein. In one embodiment, the EVPN module 625 is instantized as instances 621A to 621R.

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616, and forwarding that data out the appropriate ones of the physical NIs 616 based on the forwarding table(s) 634A-R.

Figure 6B:
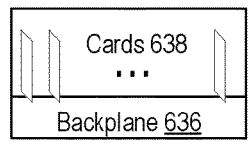
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment, the virtualization layer 654 represents a hypervisor (sometimes referred to as a virtual machine monitor (VMM)), or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application using only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels, and sets of applications that are run in different software containers). In one embodiment, the software 650 includes the EVPN module 625 that may perform method 500 discussed herein. In one embodiment, the EVPN module 625 is instantized within applications 664A to 664R.

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry-standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND, or a single card within an ND. In certain embodiments of such a hybrid network device, a platform VM (i.e., a VM that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network), or where only a single VNE is currently being implemented by an ND, the shortened term network element (NE) is sometimes used to refer to that VNE. Also, in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
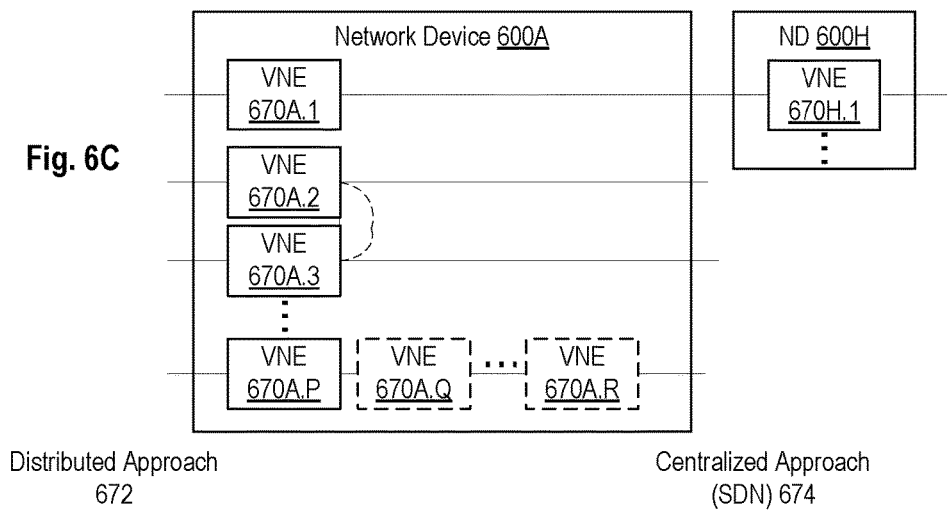
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-A.P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on an NVE (e.g., an NE/VNE on an ND, a part of an NE/VNE on an ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VSIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
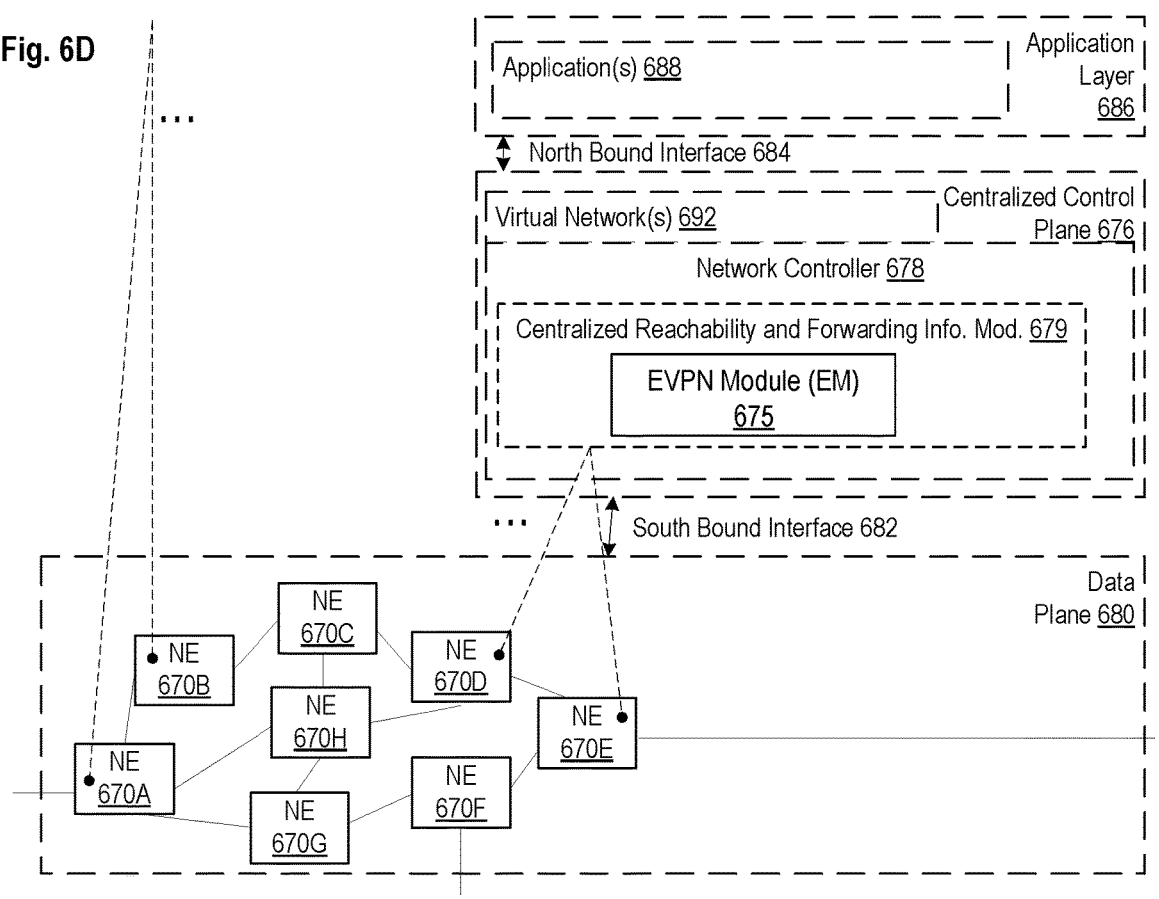
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H. In other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometimes referred to as the infrastructure layer, network forwarding plane, or forwarding plane (which should not be confused with an ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. In one embodiment, the centralized reachability and forwarding information module 679 includes an EVPN module 675 that may perform method 500 discussed herein. For example, the EVPN module 675 at the network controller may perform one or more operations of references 502-508, which cause the ingress network device to perform the operation of reference 510.

Where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general-purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674 but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or additionally, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
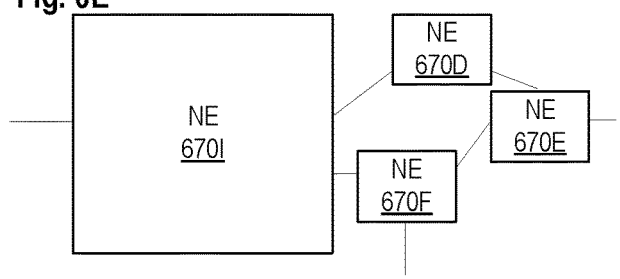
FIG. 6E illustrates the simple case of where each of the NDs implements a single NE, but a centralized control plane has abstracted multiple of the NEs in different NDs into (to represent) a single NE in one of the one or more virtual networks, according to some embodiments of the invention.
Figure 6F:
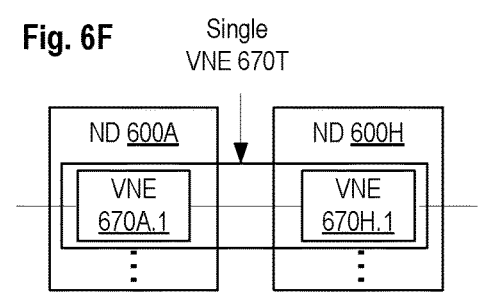
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively, illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
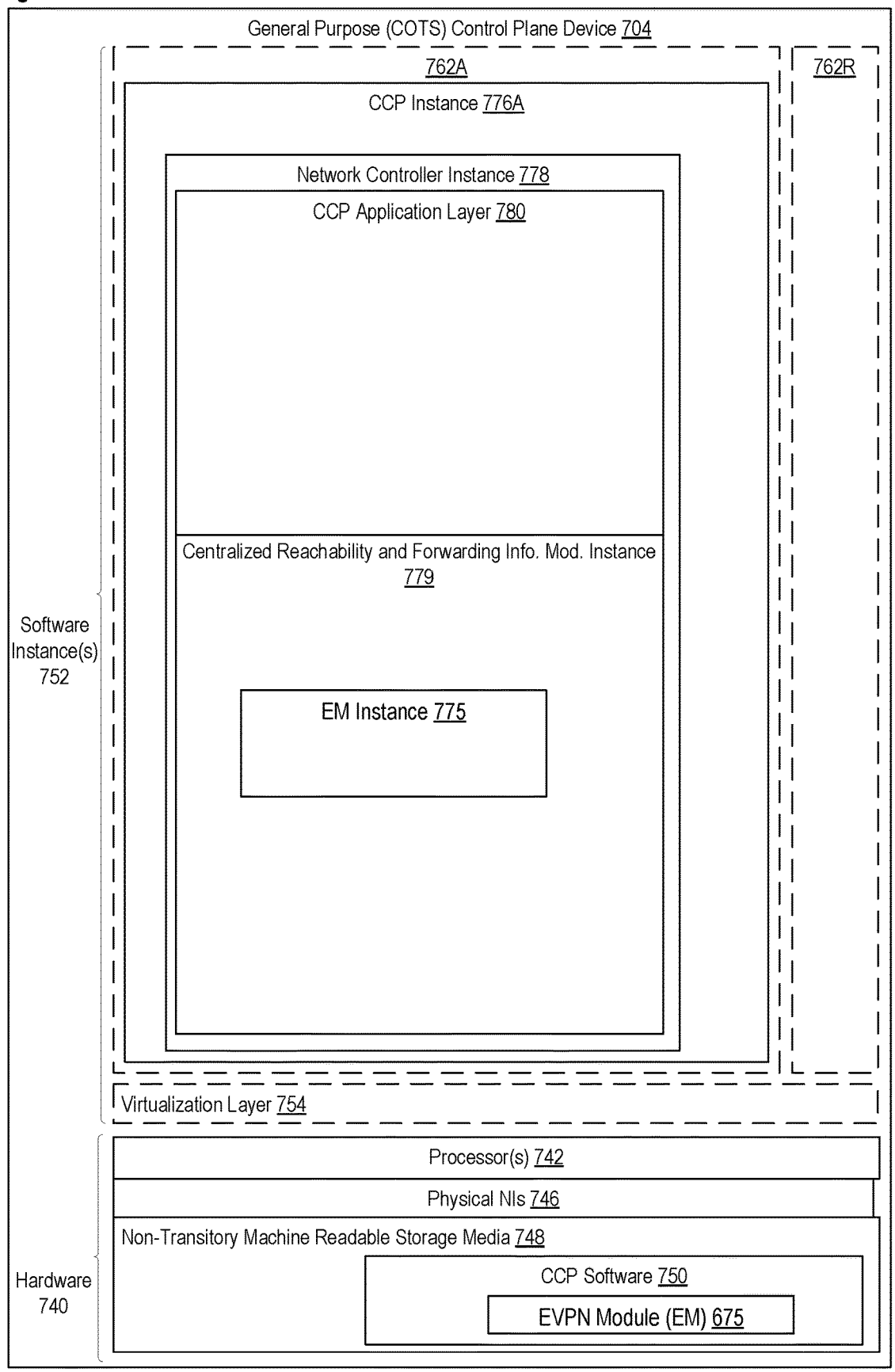
FIG. 7 illustrates a general-purpose control plane device with centralized control plane (CCP) software, according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general-purpose control plane device 704 including hardware 740 comprising a set of one or more processor(s) 742 (which are often COTS processors) and physical NIs 746, as well as non-transitory machine-readable storage media 748 having stored therein centralized control plane (CCP) software 750. In one embodiment, the CCP software 750 includes the EVPN module 675 discussed herein above.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R, if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view. In one embodiment, the EVPN module 675 is instantized as an EVPN module 775 that performs the operations of the EVPN module 675.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards, such as OpenFlow, define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occur, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). An NI (physical or virtual) may be numbered (an NI with an IP address) or unnumbered (an NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of an ND are referred to as IP addresses of that ND; at a more granular level, the IP address(es) assigned to NI(s) assigned to an NE/VNE implemented on an ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on the shortest path—multiple equal-cost next hops), some additional criteria is used—for instance, in a connectionless network, Equal Cost Multi Path (ECMP) (also known as Equal Cost Multi-Pathing, multipath forwarding and IP multipath) may be used (e.g., typical implementations use, as the criteria, particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out-of-order delivery as congestion, and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources, but is separated from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit, such as a subscriber circuit, or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), or a Frame Relay PVC). In a Layer 3 VPN, routing typically is performed by the PEs. By way of example, an edge ND that supports multiple VNEs may be deployed as a PE; and a VNE may be configured with a VPN protocol, and thus, that VNE is referred as a VPN VNE.

Some NDs provide support for VPLS (Virtual Private LAN Service). For example, in a VPLS network, end user devices access content/services provided through the VPLS network by coupling to CEs, which are coupled through PEs, coupled by other NDs. VPLS networks can be used for implementing triple-play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service), VPN services, etc. VPLS is a type of layer 2 VPN that can be used for multi-point connectivity. VPLS networks also allow end user devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudo wires and attachment circuits. PEs forward frames (received from CEs) to destinations (e.g., other CEs, other PEs) based on the MAC destination address field included in those frames.

Some of the embodiments contemplated herein above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as, read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method implemented in a network device of a network, the method comprising:
   identifying a plurality of sets of network devices, each set of network devices to include network devices belonging to one Ethernet Virtual Private Network (EVPN) Instance (EVI) of a plurality of EVIs, for which the network device serves as an ingress network device;
   selecting an aggregation set of network devices from the identified network devices to set up an aggregation tunnel label switched path (LSP) for multiple EVIs of the plurality of EVIs, wherein selecting the aggregation set further comprises including one network device into the aggregation set based on participation of the one network device in the plurality of EVIs based on a number of EVIs to which the one network device belongs and wherein the one network device is included when a measure of the number of EVIs to which the one network device belongs is over a threshold; and
   transmitting broadcast, unknown unicast, or multicast (BUM) traffic for the multiple EVIs using the aggregation tunnel LSP.

2. The method of claim 1, wherein the threshold is provided to the network device by another network device.

3. A method implemented in a network device of a network, the method comprising:
   identifying a plurality of sets of network devices, each set of network devices to include network devices belonging to one Ethernet Virtual Private Network (EVPN) Instance (EVI) of a plurality of EVIs, for which the network device serves as an ingress network device;
   selecting an aggregation set of network devices from the identified network devices to set up an aggregation tunnel label switched path (LSP) for multiple EVIs of the plurality of EVIs, wherein selecting the aggregation set comprises excluding one network device from the aggregation set based on an aggregation policy; and transmitting broadcast, unknown unicast, or multicast (BUM) traffic for the multiple EVIs using the aggregation tunnel LSP.

4. A method implemented in a network device of a network, the method comprising:

identifying a plurality of sets of network devices, each set of network devices to include network devices belonging to one Ethernet Virtual Private Network (EVPN) Instance (EVI) of a plurality of EVIs, for which the network device serves as an ingress network device;

selecting an aggregation set of network devices from the identified network devices to set up an aggregation tunnel label switched path (LSP) for multiple EVIs of the plurality of EVIs, wherein an EVI is excluded from setting up the aggregation tunnel LSP based on broadcast domains with which the EVI is configured; and transmitting broadcast, unknown unicast, or multicast (BUM) traffic for the multiple EVIs using the aggregation tunnel LSP.

5. A network device to be deployed in a network, comprising:

a processor and computer-readable storage medium that provides instructions that, when executed by the processor, cause the network device to perform:

identifying a plurality of sets of network devices, each set of network devices to include network devices belonging to one Ethernet Virtual Private Network (EVPN) Instance (EVI) of a plurality of EVIs, for which the network device serves as an ingress network device;

selecting an aggregation set of network devices from the identified network devices to set up an aggregation tunnel label switched path (LSP) for multiple EVIs of the plurality of EVIs wherein selecting the aggregation set comprises excluding one network device from the aggregation set based on an aggregation policy; and transmitting broadcast, unknown unicast, or multicast (BUM) traffic for the multiple EVIs using the aggregation tunnel LSP.

6. A network device to be deployed in a network, comprising:

a processor and computer-readable storage medium that provides instructions that, when executed by the processor, cause the network device to perform:

identifying a plurality of sets of network devices, each set of network devices to include network devices belonging to one Ethernet Virtual Private Network (EVPN) Instance (EVI) of a plurality of EVIs, for which the network device serves as an ingress network device;

selecting an aggregation set of network devices from the identified network devices to set up an aggregation tunnel label switched path (LSP) for multiple EVIs of the plurality of EVIs, wherein an EVI is excluded from setting up the aggregation tunnel LSP based on broadcast domains with which the EVI is configured; and transmitting broadcast, unknown unicast, or multicast (BUM) traffic for the multiple EVIs using the aggregation tunnel LSP.

7. A non-transitory computer-readable storage medium that provides instructions that, when executed by a processor of a network device to be implemented in a network, cause the network device to perform:

identifying a plurality of sets of network devices, each set of network devices to include network devices belonging to one Ethernet Virtual Private Network (EVPN) Instance (EVI) of a plurality of EVIs, for which the network device serves as an ingress network device;

selecting an aggregation set of network devices from the identified network devices to set up an aggregation tunnel label switched path (LSP) for multiple EVIs of the plurality of EVIs wherein selecting the aggregation set comprises excluding one network device from the aggregation set based on an aggregation policy; and transmitting broadcast, unknown unicast, or multicast (BUM) traffic for the multiple EVIs using the aggregation tunnel LSP.

* * * * *